(12) United States Patent
Lee et al.

(10) Patent No.: US 8,108,061 B2
(45) Date of Patent: Jan. 31, 2012

(54) SYSTEM AND METHOD FOR DETECTING PART ABNORMALITY IN A MANUFACTURING ASSEMBLY LINE

(75) Inventors: Gary Lee, Cambridge (CA); Bruce Peter Fleming, Guelph (CA); Chris Rudolf Loates, Woodstock (CA)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 274 days.

(21) Appl. No.: 12/418,840

(22) Filed: Apr. 6, 2009

(65) Prior Publication Data
US 2010/0256793 A1 Oct. 7, 2010

(51) Int. Cl.
*G06F 19/00* (2011.01)
*G06F 11/30* (2006.01)
*G01N 37/00* (2006.01)
*G21C 17/00* (2006.01)
*G06Q 10/00* (2006.01)

(52) U.S. Cl. .......... 700/111; 700/109; 702/84; 702/182; 705/7.26

(58) Field of Classification Search ............. 700/95–97, 700/99, 100, 102, 105, 108–111; 702/81, 702/82, 84, 182; 705/7.11, 7.12, 7.26; 340/3.1, 340/3.43, 3.44, 3.7, 3.71, 3.9; 235/376, 380, 235/462.01
See application file for complete search history.

(56) References Cited

U.S. PATENT DOCUMENTS

| | | | |
|---|---|---|---|
| 5,241,482 A | 8/1993 | Iida et al. | |
| 5,255,197 A | 10/1993 | Iida | |
| 5,859,964 A | 1/1999 | Wang et al. | |
| 6,779,726 B1 * | 8/2004 | Easton | 235/462.01 |
| 7,013,194 B2 * | 3/2006 | Hoppes et al. | 700/109 |
| 7,111,780 B2 * | 9/2006 | Broussard et al. | 235/381 |
| 7,848,835 B2 * | 12/2010 | Conway et al. | 700/97 |
| 2003/0014141 A1 * | 1/2003 | Lu | 700/100 |
| 2003/0150909 A1 * | 8/2003 | Markham et al. | 235/376 |
| 2009/0210254 A1 * | 8/2009 | Gurney | 705/3 |

* cited by examiner

*Primary Examiner* — Crystal J Barnes-Bullock
(74) *Attorney, Agent, or Firm* — Gifford, Krass, Sprinkle, Anderson & Citkowski, P.C.

(57) ABSTRACT

According to one aspect of the invention a system and method for minimizing assembly line manufacturing including an override is provided. Each workstation is equipped with a docking station. A first database is in communication with the programmable controller and the docking station, and the docking station is also in communication with the workstation tools as well as the programmable controller. The override is disposed on a docking station. The system includes a checklist of tasks that each workstation tool is to perform. Accordingly the first database will receive the checklist for each part and will record whether or not each particular part had each of its tasks performed properly. The override may be actuated so as to allow a part to flow downstream the assembly line even though the all the tasks were not completed properly, thus minimizing manufacturing disruptions.

14 Claims, 4 Drawing Sheets

Fig-4
| Repair | | | | |
|---|---|---|---|---|
| Completed | Time Stamp | Team Member | Tool | Task |
| Yes | 10/30/08 9:00 | David | RF Bolt | SG1 |
| No | 10/30/08 10:00 | Chuck | IPR Bolt | SG2 |
| Yes | 10/30/08 11:00 | John | Brake Pedal Bolt | SG3 |
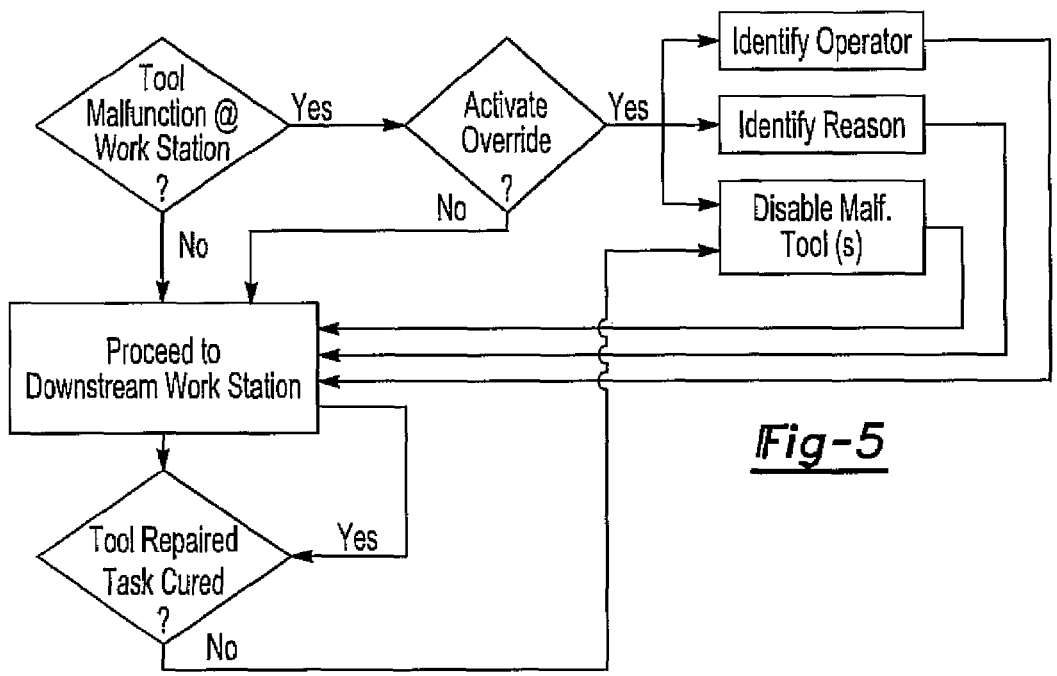
*Fig-5*
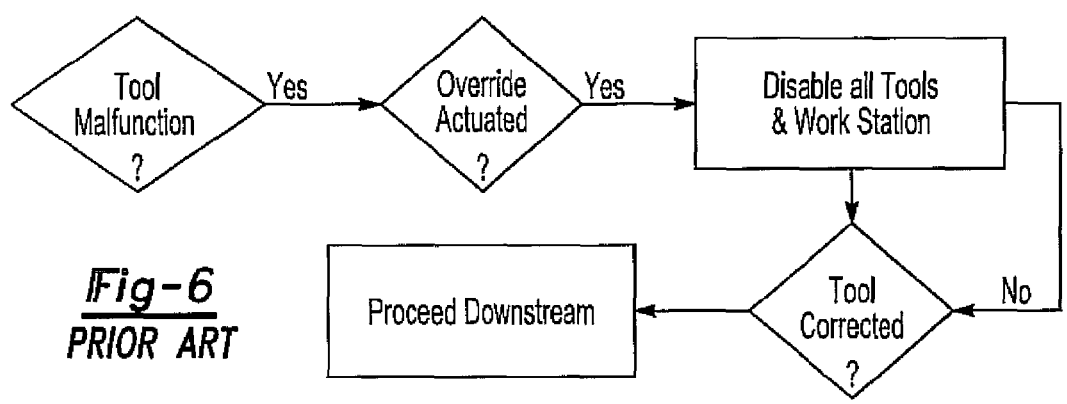
*Fig-6*
*PRIOR ART*

SYSTEM AND METHOD FOR DETECTING PART ABNORMALITY IN A MANUFACTURING ASSEMBLY LINE

FIELD OF THE INVENTION

The present invention relates to a system and method for minimizing disruptions in a manufacturing assembly line due to defective parts, and improper installation and/or part assembly. More particularly the invention relates to a system and method for minimizing disruptions in a manufacturing assembly line by providing an override which allows a defective part to proceed along the assembly line. The system also identifies the operator who actuated the override and the reason the override was actuated is reported such that the defect may be later cured.

BACKGROUND OF THE INVENTION

Assembly lines are used to mass assemble parts into a product such as a vehicle. Assembly lines are configured so as to sequentially and logically assemble the product from pre-assembled parts or raw material. It is common knowledge to establish an assembly line with a plurality of workstations. Each workstation performs a specific task that progressively assembles the finished product. Thus each workstation is tooled to accomplish its assigned task. As each workstation completes its assigned task, the part is transferred downstream the assembly line to the next workstation by a transfer system, such as a rail or a conveyor.

The workstation tools are usually monitored and controlled by a programmable controller (PC). The PC controls and detects the functions and operations of each tool so as to determine whether or not that workstation has properly completed its assigned task.

Disruptions in assembly lines can lead to unwanted expense in lost time and labor. Disruptions may result from a process abnormality, meaning a tool malfunction, improper tool performance, or an assembly worker, also referenced herein as an operator, has not properly performed a task. In such an event, the PC may stop and prevent an improperly assembled part from advancing downstream. Thus the process abnormality or the improperly assembled part can cause a disruption in the manufacturing process which in turn causes economic loss to the manufacturer.

With reference to FIG. 6, the current method for assembly line quality control is provided. The assembly line includes a stop which prevents the assembly line from advancing a part downstream. The stop may be actuated manually or automatically. The assembly line also includes an override which bypasses the stop and allows the assembly line to continue to advance parts downstream. However, in such cases the override disables all of the tools at the workstation where the process abnormality has occurred. Thus properly functioning tools are prevented from performing. Further, current systems do not capture the identification of the person who actuated the override. Lastly, current systems do not feed information relating to tool malfunction downstream the assembly line to ensure that defective parts are repaired.

Accordingly it is desirable to have a system which allows a part to advance along the manufacturing station in certain instances so as to minimize assembly line disruptions. However, it is also important and desirable to be able to identify the reasons why the part was not manufactured properly so that the error can be corrected later and also to identify the person who allowed the part to advance so as to be able to question the person and determine the reasons why. Further, it is also desirable to maintain a record of such occurrences so as to identify commonly recurring problems and provide corrective measures to prevent those problems from recurring.

SUMMARY OF THE INVENTION

According to one aspect of the invention a system and method for minimizing disruptions in an assembly line manufacturing including an override is provided. The assembly line is controlled by a programmable controller (PC) which actuates the tools in a workstation in a predetermined manner. Each workstation is equipped with a docking station having an override. A first database is in communication with the PC and the docking station. The system also includes set of assembly instructions for assembling the part. The assembly instructions are provided to the PC and the first database.

The docking station is also in communication with the workstation, PC, and the first database. The docking station monitors the workstation tools and reports the status of the tools to the first database. The docking station further includes an interface which has a display for displaying the status of each task. A checklist is provided to the docking station. The checklist includes a list of tasks for each workstation to perform. The docking station monitors the workstation and detects whether the tasks have been performed properly. The override is operable to advance the part for further processing even though the workstation tasks have not been completed.

Each docking station transmits workstation performance information to the first database so as to create a record of the status of each product. Accordingly the first database monitors the actions of the workstation to determine if the items of the checklist have been completed. The docking station communicates the status of the workstation to the first database. The first database records whether or not the assembly process has been completed in accordance with the assembly instructions. Each docking station may also transmit information to another docking station located downstream from the assembly line. The docking station further transmits the identity of the operator who actuated the override so as to record instances wherein a checklist has not been completed by a specific tool and the identity of the operator who actuated the override and allowed the part to advance for further processing. A report may be generated which provides a list of each incomplete process, the reason why the process is incomplete, the reason why the part was allowed to advance downstream, and the identity of the operator who actuated the override. The report may also provide a history of tool performance so as to allow a manager to replace or repair a tool having a history of malfunctioning, or to train a operator who has improperly performed a task.

BRIEF DESCRIPTION OF THE DRAWINGS

A better understanding of the present invention will be had upon reference to the following detailed description when read in conjunction with the accompanying drawing wherein like reference characters refer to like parts throughout the several views and in which:

FIG. 4 is an example of a report generated by the system;

FIG. 5 is a logic diagram showing how the system operates; and

FIG. 6 is a logic diagram of prior art systems.

DETAILED DESCRIPTION OF THE INVENTION

Figure 1:
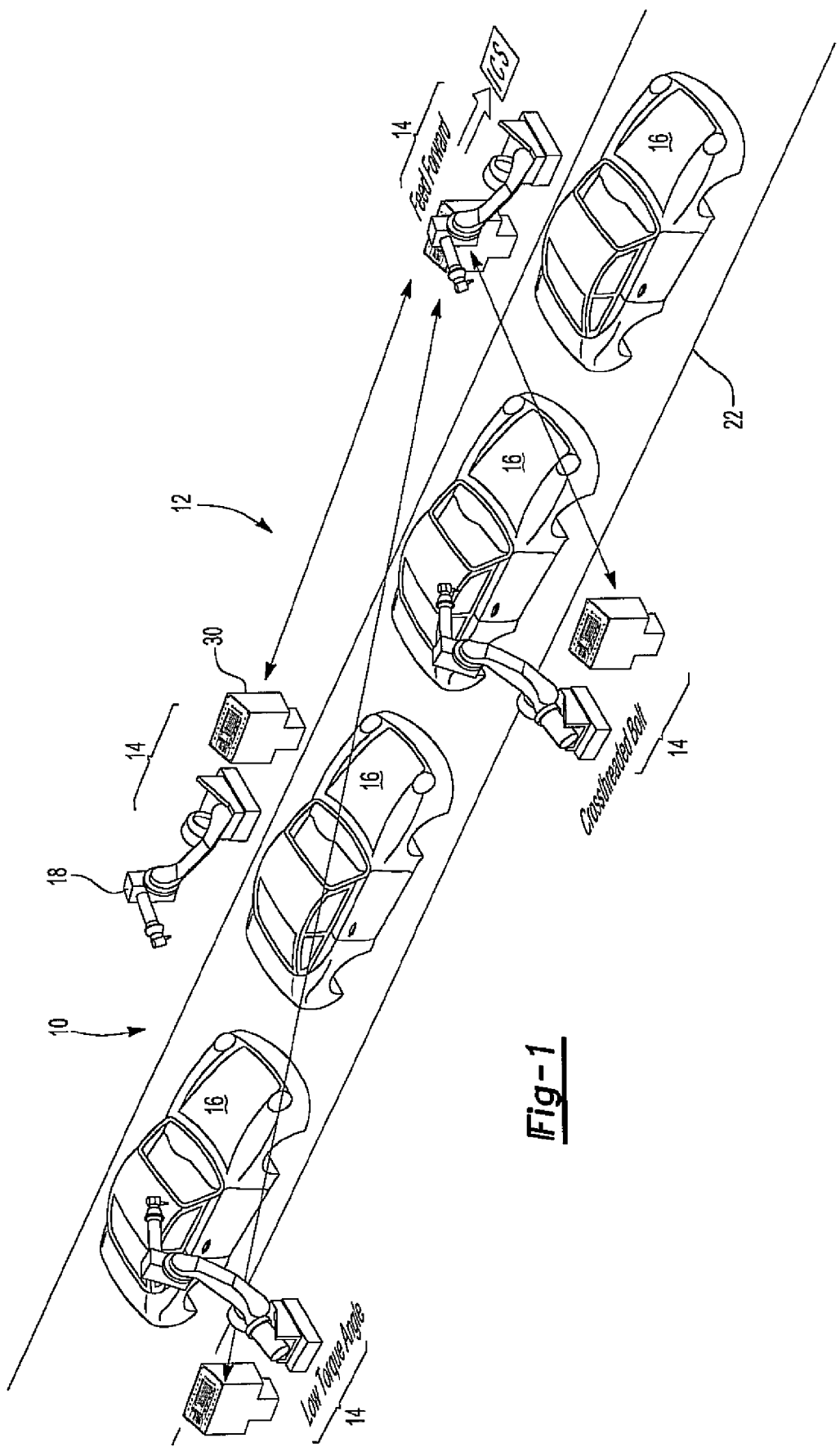
FIG. 1 is a schematic diagram of an assembly line having a plurality of workstations, each workstation is equipped with a predetermined number of tools, each of which is directed towards accomplishing a specific task and these tools are operable by a programmable controller or a operator and include a docking station in communication with the programmable controller, the tools, and a first database.

With reference to the figures a preferred embodiment of a system 10 for minimizing disruption in a manufacturing assembly line 12 is provided. With reference to FIG. 1, the manufacturing assembly line 12 includes individual workstations 14 arranged in a sequential manner so as to progressively assemble a product 16. Each workstation 14 is equipped with tools 18 so as to accomplish a predetermined task. The part 16 (shown as a vehicle) is automatically transferred along the assembly line 12 by a transfer system 22 such as a rail or a conveyor.

Figure 2:
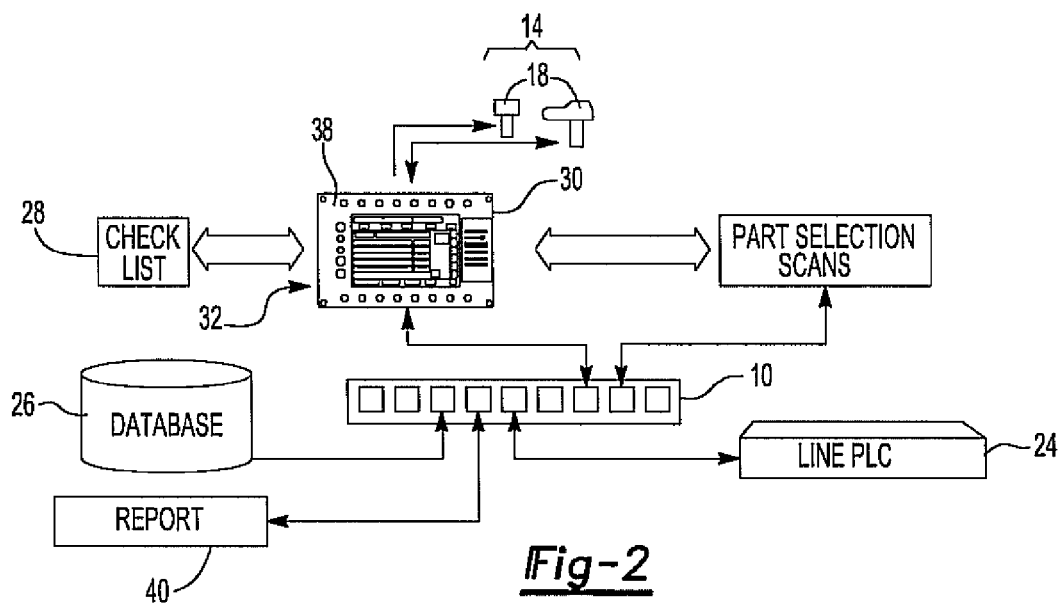
FIG. 2 is a diagram showing the system and how the various system components are interconnected.

With reference now to FIG. 2, the system 10 includes a programmable controller 24 (PC 24) for controlling each of the tools 18 in a particular workstation 14. The PC includes assembly instructions and controls the operation of the assembly line. A first database 26 is in communication with the PC 24, and stores information relating to tool 18 performance and tasks. A checklist 28 is provided for each workstation 14. The checklist 28 includes a list of tasks that each workstation tool 18 is to perform.

With reference now to FIGS. 3A-3E, the system 10 further includes a docking station 30 selectively disposed at a workstation 14 along the assembly line 12. The docking station 30 is in communication with the workstation 14 and monitors the workstation tools 18 so as to determine if the tasks assigned to the workstation 14 have been properly completed. Specifically, the docking station monitors the tools to determine if the tools have been used or are operating properly.

The docking station 30 further includes a first display 33. The first display 33 provides the status of each task assigned to the workstation 14. Specifically, the first display 33 provides all of the tools 18 of a particular workstation 14 (as indicated by the alphanumeric beginning with the letter "T"). The level of severity is indicated by a scale between "0" and "3", wherein "0" indicates that the tool 18 is performing properly, and "3" indicates the most severe of tool 18 malfunctions. Accordingly, the display will alert the operator in the event that the workstation 14 task has not been completed.

The first display 30 may include a second display 34 that may be color coded so as to provide workstation 14 operators with the status of a particular part 16 as it is being processed along the assembly line 12. For instance, the second display may include a number of visual indicators corresponding to each tool or tools assigned to the workstation. The coding may be represented in red, green, and orange, wherein red indicates that the part 16 is not completed and the line will or has been stopped, green indicates that the part 16 is completed, and orange indicates that the part 16 is not completed but the line in progress, meaning that parts 16 are being automatically transferred downstream the assembly line 12.

Figure 3A:
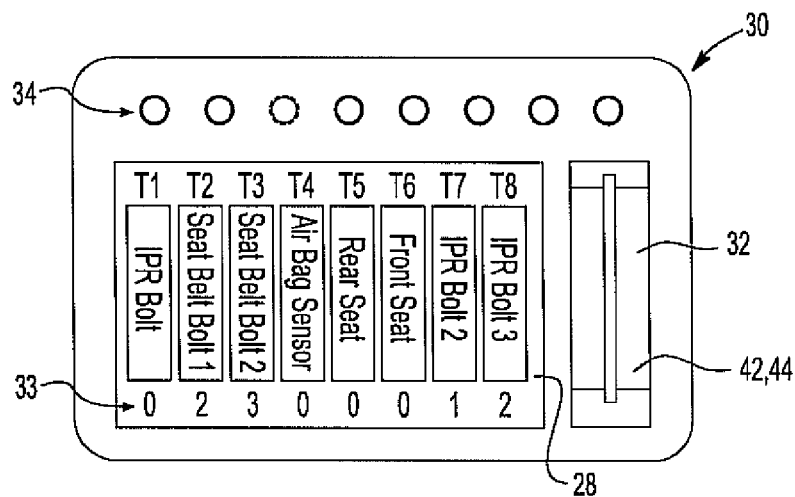
FIGS. 3a-3e is a step-by-step illustration of how the docking station operates.
Figure 3B:
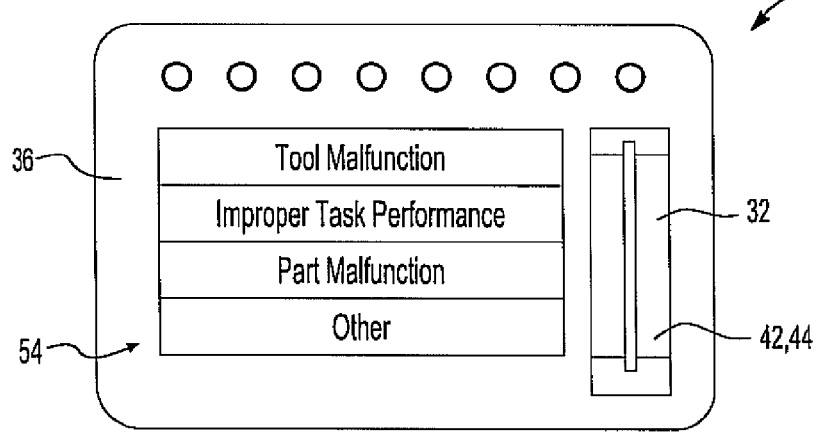
Figure 3C:
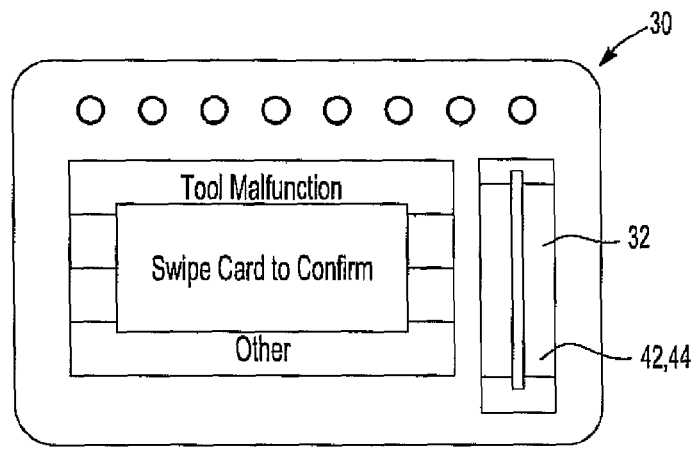

With reference to FIG. 3c, an override 32 is provided. The override 32 may be actuated so as to allow the system 10 to advance a part 16 downstream the assembly line 12 even though the tasks have not been satisfactorily performed at the workstation 14. Thus the override 32 helps minimize disruptions in the manufacturing process. Preferably the override 32 may also be operable to identify the person who actuated the override 32. For instance, the override 32 may be a magnetic card reader operable to read the identity of the card holder. In another embodiment, the override 32 is a button that is operable to obtain the fingerprint of a person. In yet another embodiment, the docking station 30 requests the identification of the operator before actuating the override 32.

With reference again to FIG. 2, the docking stations 30 are in communication with each other through a communication system 10 such as an internal Ethernet system 10 or other known communication systems. The status of each docking station 30 may be forwarded downstream, thus providing operators downstream with notice as to parts 16 or tasks which may need curing. It is also anticipated that the communication system 10 may interconnect the docking station 30 with the first database 26, and the PC 24. Thus, the PC 24 may be changed so as to reconfigure the tools 18 at each workstation 14.

The docking station 30 includes sensors (not shown) which detect the status and progress of the tools 18. A checklist 28 is provided for each workstation 14. The checklist 28 includes a list and sequence of tasks for each workstation 14. The checklist 28 may be updated when the tools 18 are reconfigured. The sensors provide information to the docking station 30 relating to tool 18 performance. Sensor information is compared with the checklist 28 to ensure that all the tasks of the checklist 28 have been completed. As the tools 18 perform their tasks, each task in the checklist 28 is checked off to show the progression of progress each tool 18 has made on a particular part 16 in a workstation 14.

The performance of the tools 18 may be represented in the first display 33 using the color or numeric code described above. As stated above, the second display 34 may be provide a green, an orange or red indicator to show the status of a particular tool 18. If a red indicator is provided, the line stops and the operator must either complete or correct the checklist items or actuate the override 32. The override 32 allows the part 16 to advance forward to the next workstation 14 downstream thereby preventing the disruption of a manufacturing process because of an abnormal process, an abnormal manufacturing of a particular part 16, or the failure of a operator to complete a task in accordance with the assembly instructions. An orange code provides notice that the override 32 was actuated and that the docking station 30 automatically forwarded the information downstream so as to provide workstations 14 downstream with an opportunity to cure the defective part 16.

In general, the first and second display 33, 34 notifies the operator when a process abnormality has occurred. In the event that the process abnormality causes the assembly line to stop progressing, the operator may actuate the override 32. The operator may selectively choose which tool or task to bypass. Alternatively may bypass all of the tools and tasks at the workstation and allow the part to proceed downstream.

With reference to FIG. 3b, the docking station 30 may further include an interface 36 operable to provide feedback to the first database 26. The interface 36 may be a touch screen, and present a list of common reasons why the part 16 was advanced forward and the operator who actuated the override 32. The first database 26 collects and processes the information using a computer processing unit 38 so as to generate a report 40.

In one embodiment, the interface 36 ascertains the identity of the operator upon actuation of the override 32. The first display 33 presents a list of reasons for which the part 16 has been advanced. The docking station 30 then transmits the checklist 28 information to include the items on the checklist 28 which have been completed or not completed as well as the identity of the operator who actuated the override 32 when such an incident occurs and the reasons for actuating the override 32.

It is also anticipated that the interface 36 can include a scanner 42 in communication with the docking station 30. The scanner 42 is operable to obtain the identification of the user. Thus each workstation 14 will scan the identity of the operator and transmit the operator's identity to the first database 26. Thus, the system 10 is able to associate the actuation of an override 32 to a particular operator. Any scanner 42 known to those skilled in the art is suitable for use with the docking station 30, illustratively including a card reader 44.

The interface 36 may also include an input device 46 which is operable to provide information to the docking station 30. Any interface 36 currently known to those skilled in the art operable to obtain the identification of an operator is suitable for use with the docking station 30, illustratively including a keyboard 48, a touch screen 50, or a voice pattern recognition device 52. The interface 36 may be used to provide the docking station 30 with a reason why the override 32 was actuated.

For instance, the interface 36 may include a touch screen menu 54 providing a predetermined list of reasons for advancing parts 16. The interface 36 may be operable to navigate the menu 54 so as to selectively choose from one of the predetermined reasons. Naturally, the docking station 30 may include both an interface 36 for manually entering a reason and a menu 54 having a predetermined list of reasons.

As stated above, the docking station 30 is in communication with the first database 26, and transmits information to the first database 26 relating to tool 18 performance, checklist 28 completion, and workstation 14 operator identity. The first database 26 is in communication with a computer processing unit 38 which processes the information so as to produce a report 40.

The report 40 provides information relating the operation of the assembly line 12 and may include information such as the number of times an override 32 was actuated, the number of times a particular operator actuated an override, the number of times a particular tool functioned improperly, and the like. The report 40 may also be specific for each vehicle at selected workstations 14 along the manufacturing line so as to ensure that all abnormalities in processing may be cured before the product 16 enters the market.

With reference to FIG. 4, an embodiment of a report 40 is provided. The report 40 includes a history of process abnormalities such as tool malfunction, improper task performance by an operator, the occurrences of override actuation, the identity of the operator who actuated the override 32 and the reasons why the override 32 was actuated. The report 40 is very useful in the maintenance of the assembly line 12. Specifically, tool history may be examined to determine if a particular tool 18 should be replaced, or to provide a repairperson with a clearer understanding of why the process abnormality occurred. Additionally, the report 40 will identify workstation operators who have actuated an override 32 and the reasons why the operator allowed the part 16 to continue downstream. This information may be useful in training workstation 14 operators.

With reference now to FIGS. 3a-3d, the operation of the system 10 is provided. The docking station 30 is disposed at each workstation 14 along the assembly line 12 and monitors each tool 18's performance. Specifically, the docking station 30 compares the performance of the tool 18 with a checklist 28 which includes benchmarks for the tool 18 to reach. Each tool 18 is represented by a visual indicator such as an LED disposed on the first display 33. The LEDs may be actuated so as to emit different colors which correspond to the status of its corresponding tool 18. For instance, the LED will emit a green color if the corresponding tool 18 is functioning properly, meaning that the tool 18 is capable of completing its assigned task.

In the event a process abnormality, the LED will emit a yellow or red color depending on how severe the process abnormality is. The first display 33 displays all of the tool 18 tasks associated with each of the workstation 14 tools 18, i.e. tighten seat belt bolt, instrument panel reinforcement (IPR) bolt, and the like. Thus, FIG. 3a shows that the tool 18 tightening the seat belt bolt 1 has not performed properly, i.e. the bolt was not tightened to a predetermined torque. The workstation 14 operator may then select the tool 18 so as override the tool 18, while allowing other tools to continue performing.

With reference now to FIG. 3b, the menu 54 is displayed on the first display 33. The menu 54 presents a predetermined list of reasons for why the tool 18 should be overridden. The workstation 14 operator simply selects one of the predetermined reasons. The menu 54 also includes another option by bypass, labeled "other." Upon selection of "other" the workstation 14 operator may manually enter a detailed reason.

Figure 3D:
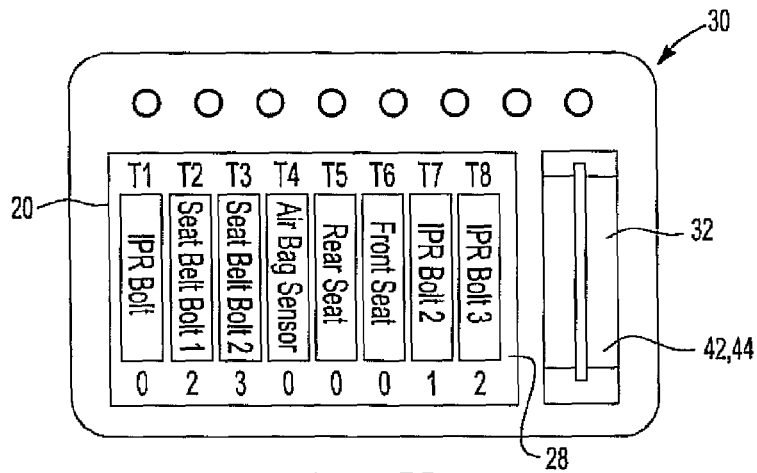
Figure 3E:
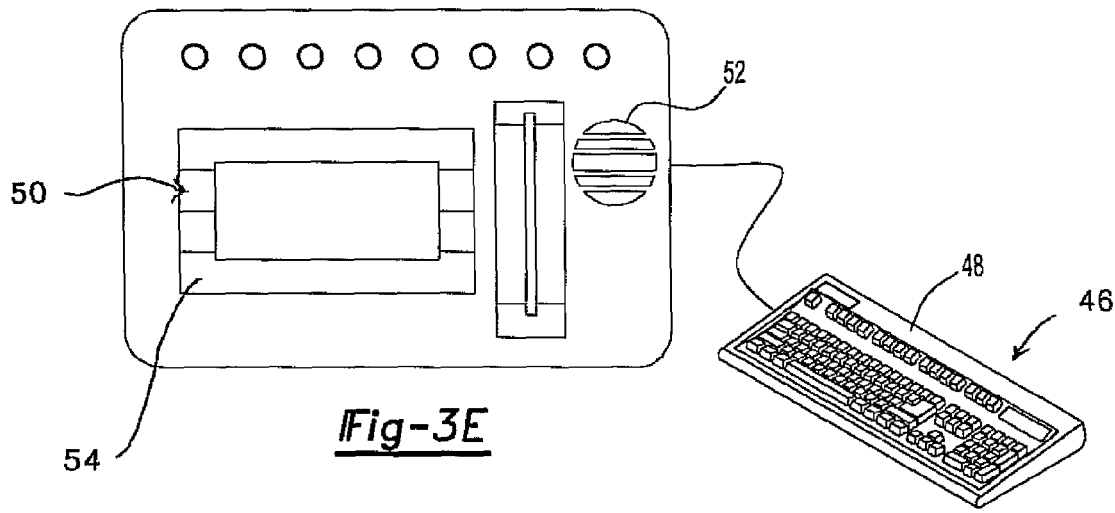

With reference now to FIG. 3c, upon entering the reason why the tool 18 is being bypassed, the display prompts the user to provide his/her identification. The user simply swipes his/her card against a card scanner 42. The identification of the workstation 14 operator as well as the reason for why the tool 18 was bypassed/overridden is then transmitted to the first database 26. With reference to FIG. 3d, the display indicates that the operational status of each tool in the workstation.

With reference now to FIG. 4, a report 40 is provided. The report 40 may be submitted downstream the assembly line 12. The report 40 is generated from the first database 26, and provides a list of all of the tools 18 which have been bypassed. The report 40 also indicates the status of each bypassed tool 18, namely whether or not if the task which the bypassed tool 18 was assigned was cured. Thus, at any point along the assembly line 12, the workstation 14 operator is able to determine the status of the product 16 and identify if any tasks were not completed properly.

With reference now to FIG. 5, a flow diagram showing the operation of the system 10 is provided. In general, the system 10 feeds information relating to tool 18 malfunctions and abnormal assembly tasks downstream the assembly line 12. Thus, the workstation 14 operators may at any workstation 14 downstream from where the tool 18 malfunction or abnormality took place, cure the problem.

A method for monitoring parts 16 being assembled at a workstation 14 along an assembly line 12 is also provided. The method includes establishing an assembly line 12 by arranging workstations 14 in a predetermined manner so as to complete a part 16 in a logical and sequential manner and providing a rail or robot to automatically transfer the part 16 along the assembly line 12. The method includes tooling each of the workstations 14 in the assembly line 12 so as to enable a predetermined task to be accomplished at each of the workstations 14 and providing a programmable controller 24 operable to control each of the tools 18 and the transfer of the part 16 along the assembly line 12.

A communication system is provided. The communication system allows for the assembly line 12 components to communicate with each other. For instance, a first database 26 is in communication with the programmable controller 24 and a docking station 30 is in communication with the PC 24, the first database 26 and each of the workstation 14. A checklist 28 is generated for each workstation 14. The checklist 28 includes tasks that each workstation 14 tool 18 is to perform. The docking station 30 is in communication with each of the workstation 14 tools 18 so as to determine if each of the workstation 14 tools 18 has completed its assigned task.

The docking station 30 includes an interface 36, a display for displaying the status of each task, and an override 32. The workstation 14 operator is able to actuate the override 32 so as to advance the part 16 for further processing even though the workstation 14 tasks have not been completed on the part 16. The docking station 30 then transmits the checklist 28 information to the first database 26 so as to create a record of the status of each part 16 as the part 16 leaves the workstation 14 thereby recording which tool 18 has not completed its assigned task.

The method can further include the step of obtaining the identification of the operator who actuated the override 32 and storing the identification of said operator in the first database 26. The method can also include the step of obtaining a reason for why the override 32 was actuated and storing the reason why the override 32 was actuated in the first database 26. The first database 26 can then report 40 out the identification of a part 16 which has not been properly completed and the reason why the part 16 was allowed to go downstream on the assembly line 12 and the reason why it was allowed to move downstream.

From the foregoing it can be seen that the present invention provides a system 10 and method for preventing and reducing the disruption of the manufacturing of a particular part 16 by allowing that particular part 16 to advance along an assembly line 12 despite the part 16 not being completed properly. Thus instead of disrupting the manufacturing process an isolated incident wherein a part 16 is not completed properly can be identified and corrected later thus preventing loss in cost and hours in the manufacturing of a product 16.

Having described the inventive system 10, however, many modifications thereto will become apparent to those skilled in the art to which it pertains without deviation from the spirit of the invention as defined by the scope of the appended claims.

We claim:

1. A system for minimizing disruptions in a manufacturing assembly line, the assembly line including a plurality of workstations sequentially arranged so as to progressively assemble a product from a part, and a transfer system for automatically transferring a part between workstations, wherein each of the plurality of workstations is equipped with tools and a sequence of processes so as to accomplish a predetermined task, the system comprising:
   a programmable controller for actuating the tools in a predetermined manner and controlling the transfer of the part;
   a first database in communication with the programmable controller;
   a checklist including a list of tasks and sequence of processes to be performed at each workstation; and
   at least one docking station selectively disposed along the assembly line, wherein each of the at least one docking station is in communication with each other, the workstation, the programmable controller, and the first database, and wherein the docking station monitors each of the workstation tools and compares the performance of each of the workstation tools with the checklist so as to determine if each of the workstation tools has completed its assigned task, the docking station including:
   an interface having a first display for displaying the status of each task and a scanner in communication with the docking station, the scanner operable to obtain the identification of the user;
   an override, wherein the override is operable to advance the part for further processing even though the workstation tasks have not been completed on the part, and wherein the docking station transmits the checklist information to the first database; and
   a computer processing unit for processing the first database so as to create a report, the report including a record of the status of each part as the part leaves the workstation, and the identity of the operator who actuated the override.

2. The system as set forth in claim 1, wherein the interface includes an input device operable to provide information to the programmable controller, and wherein information received by the input device is transmitted to the first database.

3. The system as set forth in claim 2, wherein the interface is one selected from the group consisting of a touch screen, a keyboard, and a voice recognition device.

4. The system as set forth in claim 3, wherein the scanner is a card reader.

5. The system as set forth in claim 4, wherein the input device is a menu, and the menu presents a list of reasons for disabling a tool.

6. The system as set forth in claim 1, wherein the report further includes the reason why the override was actuated so as to allow the part to continue downstream the assembly line.

7. The system as set forth in claim 1, wherein the first display further includes a second display for displaying the report so as to provide a visual indication of the status of any of the parts which have not been properly assembled.

8. The system as set forth in claim 7, wherein the second display is a code so as to provide for easy recognition of the status of a particular part.

9. The system as set forth in claim 8, wherein the code is based upon color.

10. The system as set forth in claim 1, wherein the report further includes process abnormalities comprising tool malfunction, improper task performance by an operator, the occurrences of override actuation, and the reasons why the override was actuated.

11. A method for monitoring parts being assembled in workstations along an assembly line comprising the steps of:
   establishing an assembly line by arranging workstations in a predetermined manner so as to complete a part in a logical and sequential manner;
   tooling each of the workstations in the assembly line so as to enable a predetermined task to be accomplished at each of the workstations;
   providing a transfer system to transfer a part between each of the workstations;
   providing a programmable controller operable to control each the tools and the transfer system;
   establishing a first database in communication with the programmable controller; and
   providing a docking station in communication with the programmable controller and the first database, the docking station, wherein the docking station is in communication with each of the workstation tools;
   providing a checklist including a list of tasks that each workstation tool is to perform, and wherein the docking station is also in communication with each of the workstation tools so as to determine if each of the workstation tools has completed its assigned task; and
   providing an interface including a first display for displaying the status of each task, and an override, wherein the workstation operator is able to actuate the override so as to advance the part for further processing even though the workstation tasks have not been completed on the part; and wherein the docking station transmits the checklist information to the first database so as to create a record of the status of each part as the part leaves the workstation thereby recording which tool has not completed its assigned task.

12. The method as set forth in claim 11, further including the step of obtaining the identification of the person who actuated the override, wherein the identification of the person who actuated an override is stored in the first database.

13. The method as set forth in claim 12, further including the step of obtaining a reason for why the override was actuated, wherein the reason why the override was actuated is stored in the first database.

14. The method as set forth in claim 13, further including the step of reporting the actuation of an override along with the reason why the override was actuated so as to enable a operator to perform necessary tasks on the overridden part so as to ensure that the overridden part is properly assembled.

* * * * *

UNITED STATES PATENT AND TRADEMARK OFFICE
CERTIFICATE OF CORRECTION

| | |
|---|---|
| PATENT NO. | : 8,108,061 B2 |
| APPLICATION NO. | : 12/418840 |
| DATED | : January 31, 2012 |
| INVENTOR(S) | : Gary Lee et al. |

It is certified that error appears in the above-identified patent and that said Letters Patent is hereby corrected as shown below:

Title Page, Item (57) Abstract line number 14, after though delete "the".

In the specification:

Column 6, line 13, after as insert --to--.

Column 6, line 30, after indicates delete "that".

Column 7, line 21, after report delete "40".

Signed and Sealed this
Fourteenth Day of August, 2012

David J. Kappos
*Director of the United States Patent and Trademark Office*